(12) United States Patent
Madajczak (10) Patent No.: US 8,725,989 B2
(45) Date of Patent: May 13, 2014

(54) PERFORMING FUNCTION CALLS USING SINGLE INSTRUCTION MULTIPLE DATA (SIMD) REGISTERS

(75) Inventor: Tomasz Madajczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 12/963,987

(22) Filed: Dec. 9, 2010

(65) Prior Publication Data

US 2012/0151182 A1 Jun. 14, 2012

(51) Int. Cl.
*G06F 9/30* (2006.01)
*G06F 9/44* (2006.01)

(52) U.S. Cl.
USPC .............................. 712/5; 712/217; 712/224

(58) Field of Classification Search
USPC .............................................. 712/217, 5, 224
See application file for complete search history.

(56) References Cited

U.S. PATENT DOCUMENTS

| | | | | |
|---|---|---|---|---|
| 5,671,413 | A * | 9/1997 | Shipman et al. ................... | 713/2 |
| 7,603,704 | B2 | 10/2009 | Bruening et al. | |
| 7,689,811 | B2 | 3/2010 | Dijkstra et al. | |
| 2002/0042872 | A1 * | 4/2002 | Kunimatsu et al. ........... | 712/217 |
| 2004/0205741 | A1 * | 10/2004 | Huang ........................... | 717/154 |
| 2005/0138340 | A1 * | 6/2005 | Lee et al. ....................... | 712/228 |
| 2007/0124722 | A1 | 5/2007 | Gschwind | |
| 2009/0172365 | A1 * | 7/2009 | Orenstien et al. ............. | 712/225 |
| 2012/0005444 | A1 * | 1/2012 | Rupley et al. ................. | 711/166 |

OTHER PUBLICATIONS

Settle et al., "Optimization for the Intel Itanium Architecture Register Stack", Mar. 2003, Proceedings of the International Symposium on Code Generation and Optimization (CGO'03), pp. 115-124 (reprinted pp. 1-10).*
Kernighan et al., "The C Programming Language", Mar. 1988, Prentice Hall, 2nd Ed., Section 5.2, pp. 1-3.*
International Searching Authority, "Notification of Transmittal of the International Search Report and the Written Opinion of the International Searching Authority," mailed Jun. 28, 2012, in International application No. PCT/US2011/063708.
Scott Townsend, "Itanium Processor Family Processor Advantages: Register Stack Architecture," Intel Corporation, Santa Clara, CA, Oct. 20, 2008, 7 pages.

* cited by examiner

*Primary Examiner* — Robert Fennema
*Assistant Examiner* — Yuqing Xiao
(74) *Attorney, Agent, or Firm* — Trop, Pruner & Hu, P.C.

(57) ABSTRACT

In one embodiment, a processor can perform a function call from a main program to a function that is to operate on at least one vector-type operand, in which only scalar values are passed to the function, and input values to the function including the at least one vector-type operand are to be renamed from virtual registers identified in the function to physical registers of a vector register file, and output values from the function including the at least one vector-type operand are to be renamed from virtual registers identified in the function to physical registers of the vector register file. Other embodiments are described and claimed.

16 Claims, 9 Drawing Sheets

PERFORMING FUNCTION CALLS USING SINGLE INSTRUCTION MULTIPLE DATA (SIMD) REGISTERS

BACKGROUND

Modern three-dimensional (3D) graphics processors are typically simple reduced instruction set computing (RISC) designs that are equipped with very large register files and registers having 256, 512 or more bits. Such RISC processors are then connected in so-called vector or single instruction multiple data (SIMD) rows that share an instruction cache and sometimes also a data cache. Such architectures can effectively process simple shader programs used in 3D rendering techniques. However they have problems in function calling, as to implement a function call stack they would need to transport very large register values (at least 256 bits wide) to and from memory (as there is typically a very limited local data cache). Also current state-of-the-art SIMD architectures are not equipped with any kind of function call stack. Thus current SIMD architectures do not perform function calls, and instead inline functions into code and consequently they support only a limited depth of function calling. In such case the code size grows very quickly, worsening utilization of the instruction cache.

DETAILED DESCRIPTION

In various embodiments, function calling can occur in a SIMD processor architecture. To realize such function calling, embodiments may virtualize register names so that functions use so-called virtual registers instead of real registers or stack variables. Virtual registers, which correspond to register identifiers within function code, can be resolved to real registers and vice versa by a renaming process that is performed invisibly to a compiler or application code. The renaming process may be implemented using a stack (e.g., a doubleword (DW) stack) that passes only return function pointer and state, so that the use of the stack is kept as minimal as possible.

As such, embodiments may combine features of a conventional stack with the renaming of large SIMD registers. Note that the terms "vector" and "SIMD" are used interchangeably to mean operands that include a plurality of individual data elements (e.g., 16 bit units) packed into a single register or other storage element. Conceptually, embodiments can be perceived similarly to a RISC register ring, but it is more efficient as it does not use move instructions to perform push and pop from a stack for function parameters (instead a single renaming instruction may be provided). In addition, embodiments may be particularly applicable to SIMD architectures, as globally visible registers can be used together with locally renamed registers at the same time. In this way, embodiments can be incorporated in various modern microprocessor architectures to reduce the cost of function calling.

As mentioned earlier, embodiments provide a hybrid method having both a stack for scalar registers (which in an embodiment may be of doubleword width) and renaming capability for large SIMD registers. In this way, functions can be used without any limitations. Accordingly, SIMD program code can be much smaller and can cope with recurrences. Instead of pushing large SIMD registers to a stack, these registers may be renamed. In case the renaming cannot complete due to a lack of available SIMD registers, embodiments may spill registers to memory to free a number of them and fill registers back from memory as needed.

There may be several trade-offs in comparison of an embodiment of the present invention and function inlining. First, some instructions and cycles may be added to a program to perform a function call. Also upon the condition there are too few free registers for renaming, a spill-fill is done that has a certain cost. However, by using an embodiment with function calls, code can be as small as reasonable and thus better utilize an instruction cache.

To implement register renaming and function calling, Real Registers and Virtual Registers are distinguished to denote original register numbers and renamed register numbers, respectively. Function calls can be classified into two groups, namely primary or first level calls if they are called with Real Registers, from the main program for example, and secondary or second level calls if they are called with Virtual Registers, from a subroutine (function) for example.

Renaming may use a number of components including an input output register mask, an input virtual register mask, an input output rename table, an unused register mask, an unused virtual register mask, a local register mask, an entry selector, a local rename table, a local spill fill mask, a back rename shifter, and a register mask decoder. Each of these different components will be discussed in turn. To aid in understanding an implementation of these registers, reference can be made to FIG. 1.

Figure 1:
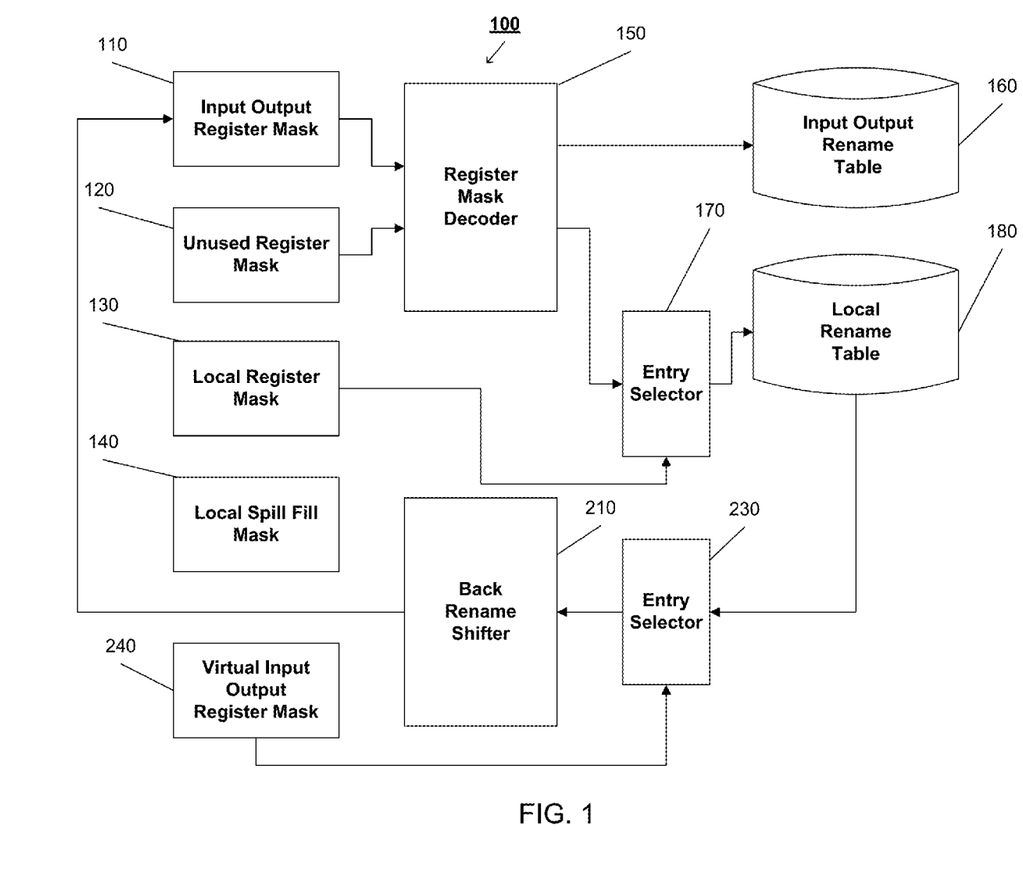
FIG. 1 is a block diagram of a portion of a processor in accordance with an embodiment of the present invention.

Referring now to FIG. 1, shown is a block diagram of a portion of a processor in accordance with an embodiment of the present invention. As shown in FIG. 1, processor 100 may include various components to be used for implementing function calls for handling SIMD operands in accordance with an embodiment of the present invention.

As shown in FIG. 1, various register masks may be present. Each of these register masks may correspond to a specific register of a processor, and may be used to store information used in a process of renaming SIMD registers used within functions to physical registers. As seen, these register masks may include an input output register mask 110, and unused register mask 120, and a local register mask 130. Still further as will be discussed below, embodiments may also include a local spill fill mask 140.

To generate information for use for first or second level functions, the masks may be provided to a register mask decoder 150 which may use a given decoding formula to decode the register masks into entries within rename tables. Specifically shown in FIG. 1, such rename tables may include an input output rename table 160 and a local rename table 180. In general, input output register mask 110 may be provided to register mask decoder 150 to generate entries for input output rename table 160. Similarly, unused register mask 120 may be provided to register mask decoder 150 to generate entries for local rename table 180, further using local register mask 130 as a selection criteria for an entry selector 170 coupled between register mask decoder 150 and local rename table 180. As further seen in FIG. 1, local rename table 180 may further be coupled by an entry selector 230 to a back rename shifter 210, that in turn provides information to input output register mask 110. As further seen, a virtual input output register mask 240 may also be present, in some embodiments. While shown with these particular components in the embodiment of FIG. 1, understand the scope of the present invention is not limited in this regard. Also while the discussion with regard to the components of FIG. 1 is with specific reference to the elements shown therein, understand that the following discussion of the various register masks, decoders, rename tables and so forth may be more generally applied to different implementations.

In one embodiment, the InputOutputRegisterMask may be a processor special register containing a mask programmed from a main routine of the program (first level) to assign input and output registers for a called function (e.g., function parameters). This mask can be set by a compiler before the function call. Writing a value to this special register starts a mask decoding process, so that the RegisterMaskDecoder fills consecutive entries of the InputOutputRenameTable. Each bit set in this mask denotes an order (e.g., by bit position) of a Real Register Number to be used as a virtual input to the called function. Therefore there is strict assumption that Real Registers are assigned orderly by the compiler to be inputs for an upcoming function call.

In one embodiment, the VirtualInputOutputRegisterMask is a mask programmed from subroutines (second level) to assign Virtual Registers to be input and output registers for a called function. In one embodiment, the mask may be implemented as a virtual processor register (and may be a re-use of the InputOutputRegisterMask). For a second level function call, the VirtualInputOutputRegisterMask can be set by the compiler before the second level function call. In various embodiments, the VirtualInputOutputRegisterMask is automatically and implicitly in hardware resolved back to the InputOutputRegisterMask (to Real Register Numbers using the InputOutputRenameTable), so that each function uses the InputOutputRegisterMask to rename inputs and outputs. Further details regarding this process are described further below. It is assumed that any modification of the InputOutputRegisterMask or the InputVirtualRegisterMask programs an input register mapping mechanism so that it is ready for use within the subroutine.

In one embodiment, the InputOutputRenameTable may be a processor register table maintaining mappings between Virtual Input Output Register Numbers and Real Register Numbers. In turn, the UnusedRegisterMask is a processor special register that may be in a bit-mask form that stores the list of registers that can be used for renaming. To resolve Local Virtual Registers to Real Registers, the compiler delivers the UnusedRegisterMask to each first level function call. In other words, the compiler acts to insert a special instruction that sets the value of the UnusedRegisterMask using the immediate value learned during the compilation process, as it is usual that the compilation process tracks the register life ranges for all registers. This mask may have capacity to assign one bit per register (e.g., from the pool/file of registers allowed to be renamed) and which specifies if set that the register can be used for renaming. Otherwise, if the bit is clear it means that the corresponding register cannot be used for renaming. Bits of this mask can be assigned to registers in order so that a first-bit-set logic operation on the mask returns the first available for remapping register number. The local register renaming process (in some implementations) may be done during allocation of local Virtual Registers for a function. The process uses the current value of the UnusedRegisterMask, as will be described further below.

A VirtualUnusedRegisterMask is a mask programmed from subroutines (e.g., second level) to remove some Virtual Registers from the further renaming process if their lifetime is larger than the function to be called. The compiler also delivers an immediate value to modify the VirtualUnusedRegisterMask to each second level function call to remove from the further renaming process these Local Virtual Registers having an active life range beyond the function call. Each bit cleared in the VirtualUnusedRegisterMask denotes a register that cannot be used for further renaming. The VirtualUnusedRegisterMask is automatically resolved by hardware into the UnusedRegisterMask with a type of back-renaming process. Before such a modification, the program may store the previous value of the UnusedRegisterMask by pushing it to the stack. After return from the subroutine, the program restores the UnusedRegisterMask (e.g., by popping it from the stack).

The LocalRegisterMask is a processor special register containing a mask programmed from subroutines (e.g., second level) that is used to allocate local Virtual Registers. Writing a value to this special register starts a mask decoding process. The number of bits set in the mask specifies how many registers are allocated, and the positions of set bits in the mask identify the Virtual Register Numbers. In one embodiment, the Real Register Numbers can be taken from the UnusedRegisterMask and passed to the RegisterMaskDecoder which fills the consecutive entries of LocalRenameTable. In other words, the UnusedRegisterMask is passed to the inputs of RegisterMaskDecoder and then the LocalRegisterMask is used to obtain the correct subset (e.g., using a multiplexer) of the decoder outputs, as will be shown further below.

In one embodiment, this multiplexer may be an EntrySelector to select outputs of the RegisterMaskDecoder that are to fill the LocalRenameTable. The LocalRegisterMask is used as the selection input according to the rule that a bit set in the mask selects the corresponding output. In one embodiment, if the output is not selected, then a null value is passed (it can be 0, or −1, depending on implementation).

In one embodiment, the LocalRenameTable is a processor register table maintaining mapping between Virtual Local Register Numbers and Real Register Numbers. In turn, the LocalSpillFillMask is a processor register containing a mask denoting the registers spilled to memory to be filled upon the return from the function that performed spilling. In one embodiment, this mask may be stored in the stack during spilling and restored during filling.

Figure 2:
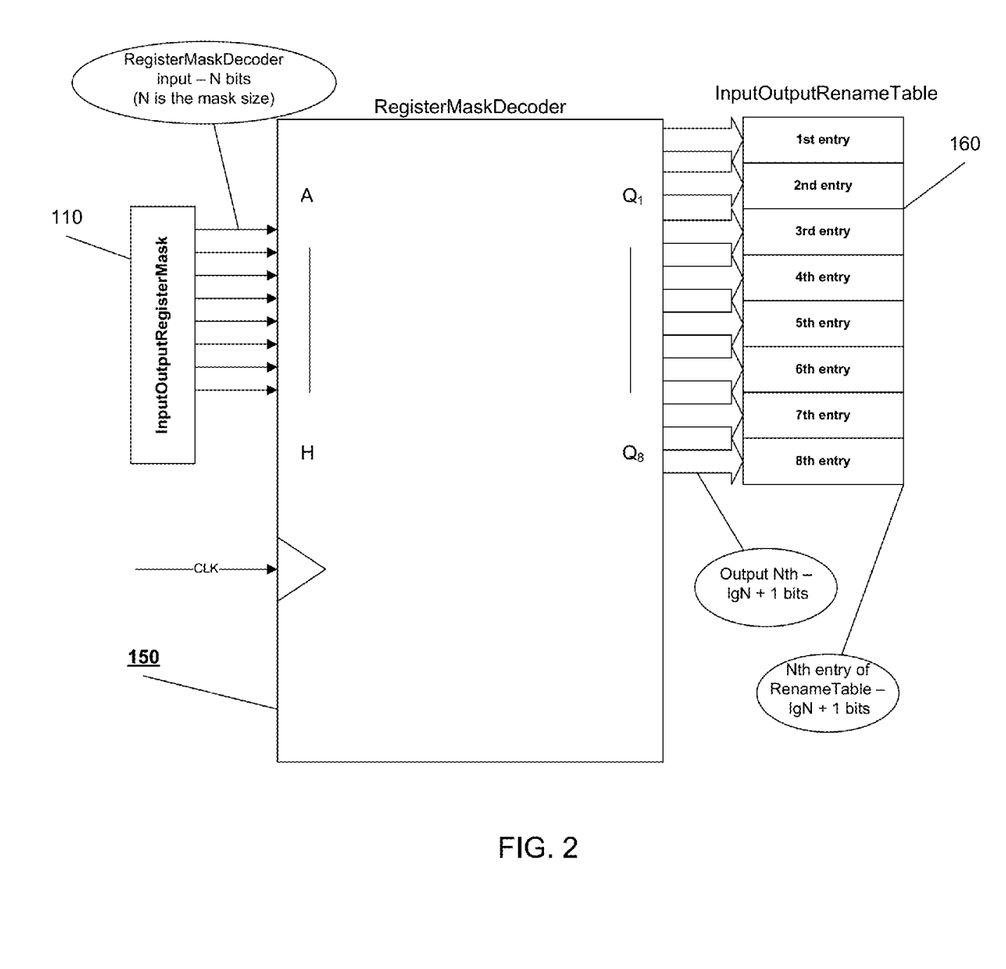
FIG. 2 is a block diagram illustrating operation of a register mask decoder in accordance with an embodiment of the present invention.

In one embodiment, the RegisterMaskDecoder may be a hardware unit responsible for decoding register masks into rename tables. The input of the RegisterMaskDecoder is a binary mask, namely the InputOutputRegisterMask or UnusedRegisterMask. The decoder has a number of outputs equal to the length of the input binary mask. Referring now to FIG. 2, shown is a block diagram illustrating operation of a register mask decoder in accordance with an embodiment of the present invention. As shown in FIG. 2, register mask decoder 150 may be implemented as a solver to receive input output register mask 110 and to generate a plurality of entries of input output rename table 160. Note that in the embodiment of FIG. 2, input output register mask 110 may be 8 bits, and accordingly, input output rename table 160 may provide for 8 entries. More generally, for a mask size of N, a rename table may include N entries-log N+1 bits.

Figure 3:
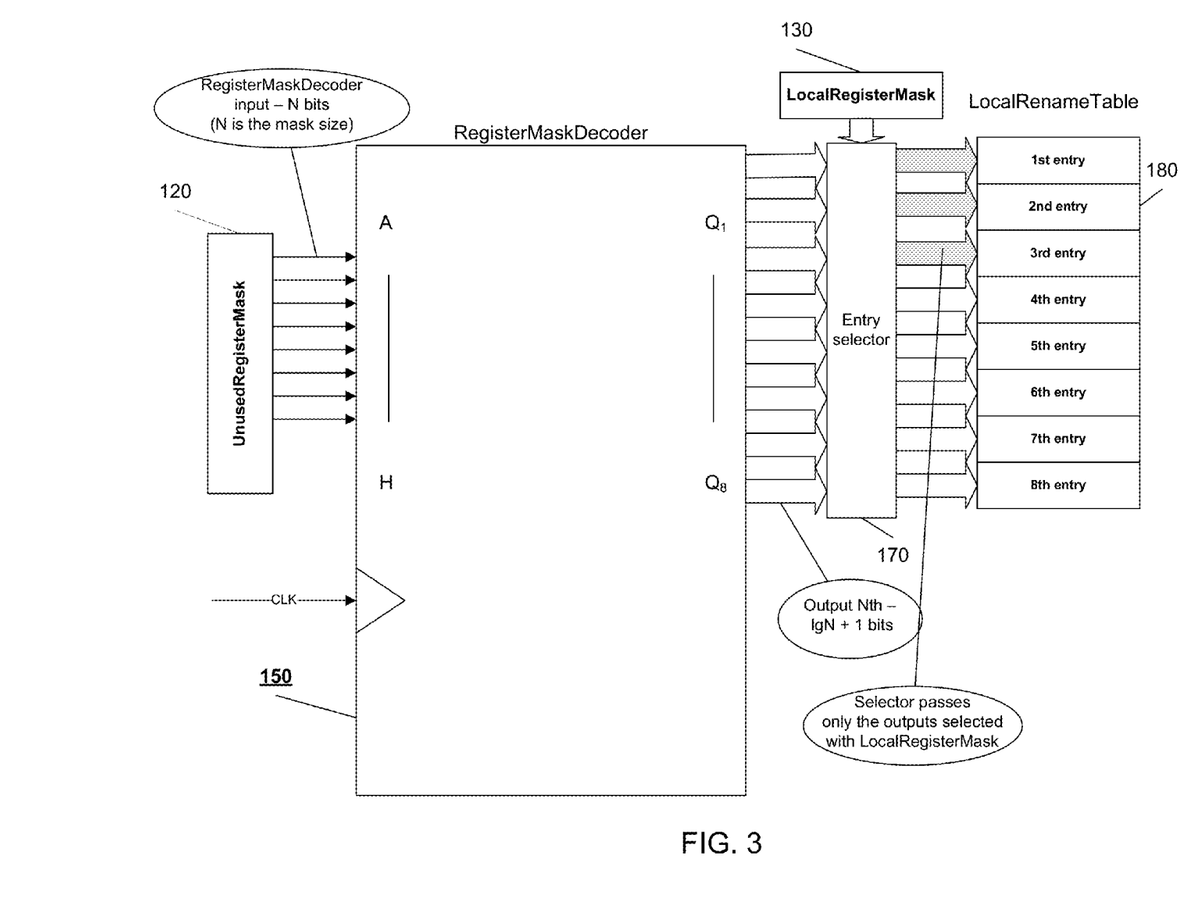
FIG. 3 is a block diagram illustrating operation of a register mask decoder for handling input of an unused register mask in accordance with an embodiment of the present invention.

Referring now to FIG. 3, shown is a block diagram illustrating operation of a register mask decoder for handling input of an unused register mask in accordance with an embodiment of the present invention. As shown in FIG. 3, register mask decoder 150 may be coupled to receive unused register mask 120 and to generate a plurality of outputs (e.g., N outputs corresponding to the N bits of the mask). In turn, these outputs may be provided to entry selector 170, which is controlled by local register mask 130 to thus pass only the outputs selected by local register mask 130 for storage into local rename table 180. In one embodiment, a hardware implementation of the InputOutputRenameTable and LocalRenameTable can take the form of a table of registers (having log 2N+1 bits where N is the mask length (log 2N is noted as lgN on FIGS. 2-3)) in which subsequent entries contain positions of set bits in the mask. While shown these particular illustrations in the embodiments of FIGS. 2 and 3, understand the scope of the present invention is not limited in this regard.

In one embodiment, the outputs (Q1 to Qn) of the register mask decoder may be set according to the order of information in the input mask. More specifically, the decoder may output entries Q1-Q8 as follows:

i) first bit set in the mask—this is a function of output Q1;
ii) second bit set in the mask—this is the function of output Q2
iii) third bit set in the mask—this is the function of output Q3 . . . and so on as long as
iv) Nth bit set in the mask—this is the function of output Qn.

In the other words, on the first output (Q1) the RegisterMaskDecoder returns the Real Register Number of the first Virtual Register used as input or local register in a function. The second output (Q2) returns the Real Register Number of the second Virtual Register, and similar rules applies to the remaining outputs. If there is not any Real Register Number to be mapped to a certain Virtual Register Number, then the corresponding decoder output returns the null value, which may be 0 or −1 depending on implementation. The Karnught tables of Tables 1-4 corresponding to the decoder operations assume that the null value is 0. More specifically, Tables 1-4 depict the Boolean functions of the first, second, third, and eighth RegisterMaskDecoder outputs for the 8-bit length mask. If masks are very large, the masks may be decoded in parts and the results of consecutive decoding passes may be merged in hardware.

TABLE 1

Karnought Table for Output Q1 Function - first bit set in the mask, assumption "a" position is the lowest significant, "h" is the most significant, output equal to 0 means none bit detected as first

| | hgfe | | | | | | | | | | | | | | | |
|---|---|---|---|---|---|---|---|---|---|---|---|---|---|---|---|---|
| dcba | 0000 | 0001 | 0011 | 0010 | 0110 | 0111 | 0101 | 0100 | 1100 | 1101 | 1111 | 1110 | 1010 | 1011 | 1010 | 1000 |
| 0000 | 0 | 5 | 5 | 6 | 6 | 5 | 5 | 7 | 7 | 5 | 5 | 6 | 6 | 5 | 6 | 8 |
| 0001 | 1 | 1 | 1 | 1 | 1 | 1 | 1 | 1 | 1 | 1 | 1 | 1 | 1 | 1 | 1 | 1 |
| 0010 | 2 | 2 | 2 | 2 | 2 | 2 | 2 | 2 | 2 | 2 | 2 | 2 | 2 | 2 | 2 | 2 |
| 0011 | 1 | 1 | 1 | 1 | 1 | 1 | 1 | 1 | 1 | 1 | 1 | 1 | 1 | 1 | 1 | 1 |
| 0010 | 2 | 2 | 2 | 2 | 2 | 2 | 2 | 2 | 2 | 2 | 2 | 2 | 2 | 2 | 2 | 2 |
| 0110 | 2 | 2 | 2 | 2 | 2 | 2 | 2 | 2 | 2 | 2 | 2 | 2 | 2 | 2 | 2 | 2 |
| 0111 | 1 | 1 | 1 | 1 | 1 | 1 | 1 | 1 | 1 | 1 | 1 | 1 | 1 | 1 | 1 | 1 |
| 0110 | 2 | 2 | 2 | 2 | 2 | 2 | 2 | 2 | 2 | 2 | 2 | 2 | 2 | 2 | 2 | 2 |
| 0100 | 3 | 3 | 3 | 3 | 3 | 3 | 3 | 3 | 3 | 3 | 3 | 3 | 3 | 3 | 3 | 3 |
| 1100 | 3 | 3 | 3 | 3 | 3 | 3 | 3 | 3 | 3 | 3 | 3 | 3 | 3 | 3 | 3 | 3 |
| 1110 | 2 | 2 | 2 | 2 | 2 | 2 | 2 | 2 | 2 | 2 | 2 | 2 | 2 | 2 | 2 | 2 |
| 1111 | 1 | 1 | 1 | 1 | 1 | 1 | 1 | 1 | 1 | 1 | 1 | 1 | 1 | 1 | 1 | 1 |
| 1110 | 2 | 2 | 2 | 2 | 2 | 2 | 2 | 2 | 2 | 2 | 2 | 2 | 2 | 2 | 2 | 2 |
| 1010 | 2 | 2 | 2 | 2 | 2 | 2 | 2 | 2 | 2 | 2 | 2 | 2 | 2 | 2 | 2 | 2 |
| 1011 | 1 | 1 | 1 | 1 | 1 | 1 | 1 | 1 | 1 | 1 | 1 | 1 | 1 | 1 | 1 | 1 |
| 1010 | 2 | 2 | 2 | 2 | 2 | 2 | 2 | 2 | 2 | 2 | 2 | 2 | 2 | 2 | 2 | 2 |
| 1001 | 1 | 1 | 1 | 1 | 1 | 1 | 1 | 1 | 1 | 1 | 1 | 1 | 1 | 1 | 1 | 1 |
| 1000 | 4 | 4 | 4 | 4 | 4 | 4 | 4 | 4 | 4 | 4 | 4 | 4 | 4 | 4 | 4 | 4 |

TABLE 2

Karnought Table for Output Q2 Function - second bit set in the mask, assumption "a" position is the lowest significant, "h" is the most significant, output equal to 0 means none bit detected as second

| | Hgfe | | | | | | | | | | | | | | | |
|---|---|---|---|---|---|---|---|---|---|---|---|---|---|---|---|---|
| dcba | 0000 | 0001 | 0011 | 0010 | 0110 | 0111 | 0101 | 0100 | 1100 | 1101 | 1111 | 1110 | 1010 | 1011 | 1010 | 1000 |
| 0000 | 0 | 0 | 6 | 0 | 7 | 6 | 7 | 0 | 8 | 7 | 6 | 7 | 8 | 6 | 8 | 0 |
| 0001 | 0 | 5 | 5 | 6 | 6 | 5 | 5 | 7 | 7 | 5 | 5 | 6 | 6 | 5 | 6 | 8 |
| 0010 | 0 | 5 | 5 | 6 | 6 | 5 | 5 | 7 | 7 | 5 | 5 | 6 | 6 | 5 | 6 | 8 |
| 0011 | 2 | 2 | 2 | 2 | 2 | 2 | 2 | 2 | 2 | 2 | 2 | 2 | 2 | 2 | 2 | 2 |
| 0010 | 0 | 5 | 5 | 6 | 6 | 5 | 5 | 7 | 7 | 5 | 5 | 6 | 6 | 5 | 6 | 8 |
| 0110 | 3 | 3 | 3 | 3 | 3 | 3 | 3 | 3 | 3 | 3 | 3 | 3 | 3 | 3 | 3 | 3 |
| 0111 | 2 | 2 | 2 | 2 | 2 | 2 | 2 | 2 | 2 | 2 | 2 | 2 | 2 | 2 | 2 | 2 |
| 0110 | 3 | 3 | 3 | 3 | 3 | 3 | 3 | 3 | 3 | 3 | 3 | 3 | 3 | 3 | 3 | 3 |
| 0100 | 0 | 5 | 5 | 6 | 6 | 5 | 5 | 7 | 7 | 5 | 5 | 6 | 6 | 5 | 6 | 8 |

TABLE 2-continued

Karnought Table for Output Q2 Function - second bit set in the mask, assumption "a" position
is the lowest significant, "h" is the most significant, output equal to 0 means none bit detected as second

| | Hgfe | | | | | | | | | | | | | | | |
|---|---|---|---|---|---|---|---|---|---|---|---|---|---|---|---|---|
| dcba | 0000 | 0001 | 0011 | 0010 | 0110 | 0111 | 0101 | 0100 | 1100 | 1101 | 1111 | 1110 | 1010 | 1011 | 1010 | 1000 |
| 1100 | 4 | 4 | 4 | 4 | 4 | 4 | 4 | 4 | 4 | 4 | 4 | 4 | 4 | 4 | 4 | 4 |
| 1110 | 3 | 3 | 3 | 3 | 3 | 3 | 3 | 3 | 3 | 3 | 3 | 3 | 3 | 3 | 3 | 3 |
| 1111 | 2 | 2 | 2 | 2 | 2 | 2 | 2 | 2 | 2 | 2 | 2 | 2 | 2 | 2 | 2 | 2 |
| 1110 | 3 | 3 | 3 | 3 | 3 | 3 | 3 | 3 | 3 | 3 | 3 | 3 | 3 | 3 | 3 | 3 |
| 1010 | 4 | 4 | 4 | 4 | 4 | 4 | 4 | 4 | 4 | 4 | 4 | 4 | 4 | 4 | 4 | 4 |
| 1011 | 2 | 2 | 2 | 2 | 2 | 2 | 2 | 2 | 2 | 2 | 2 | 2 | 2 | 2 | 2 | 2 |
| 1010 | 4 | 4 | 4 | 4 | 4 | 4 | 4 | 4 | 4 | 4 | 4 | 4 | 4 | 4 | 4 | 4 |
| 1001 | 4 | 4 | 4 | 4 | 4 | 4 | 4 | 4 | 4 | 4 | 4 | 4 | 4 | 4 | 4 | 4 |
| 1000 | 0 | 5 | 5 | 6 | 6 | 5 | 5 | 7 | 7 | 5 | 5 | 6 | 6 | 5 | 6 | 8 |

TABLE 3

Karnought Table for Output Q3 Function - third bit set in the mask, assumption "a" position
is the lowest significant, "h" is the most significant, output equal to 0 means none bit detected as third

| | hgfe | | | | | | | | | | | | | | | |
|---|---|---|---|---|---|---|---|---|---|---|---|---|---|---|---|---|
| dcba | 0000 | 0001 | 0011 | 0010 | 0110 | 0111 | 0101 | 0100 | 1100 | 1101 | 1111 | 1110 | 1010 | 1011 | 1010 | 1000 |
| 0000 | 0 | 0 | 0 | 0 | 0 | 7 | 0 | 0 | 0 | 8 | 7 | 8 | 0 | 8 | 0 | 0 |
| 0001 | 0 | 0 | 6 | 0 | 7 | 6 | 7 | 0 | 8 | 7 | 6 | 7 | 8 | 6 | 8 | 0 |
| 0010 | 0 | 0 | 6 | 0 | 7 | 6 | 7 | 0 | 8 | 7 | 6 | 7 | 8 | 6 | 8 | 0 |
| 0011 | 0 | 5 | 5 | 6 | 6 | 5 | 5 | 7 | 7 | 5 | 5 | 6 | 6 | 5 | 6 | 8 |
| 0010 | 0 | 0 | 6 | 0 | 7 | 6 | 7 | 0 | 8 | 7 | 6 | 7 | 8 | 6 | 8 | 0 |
| 0110 | 0 | 5 | 5 | 6 | 6 | 5 | 5 | 7 | 7 | 5 | 5 | 6 | 6 | 5 | 6 | 8 |
| 0111 | 3 | 2 | 2 | 2 | 2 | 2 | 2 | 2 | 2 | 2 | 2 | 2 | 2 | 2 | 2 | 2 |
| 0101 | 0 | 5 | 5 | 6 | 6 | 5 | 5 | 7 | 7 | 5 | 5 | 6 | 6 | 5 | 6 | 8 |
| 0100 | 0 | 0 | 6 | 0 | 7 | 6 | 7 | 0 | 8 | 7 | 6 | 7 | 8 | 6 | 8 | 0 |
| 1100 | 0 | 5 | 5 | 6 | 6 | 5 | 5 | 7 | 7 | 5 | 5 | 6 | 6 | 5 | 6 | 8 |
| 1101 | 4 | 4 | 4 | 4 | 4 | 4 | 4 | 4 | 4 | 4 | 4 | 4 | 4 | 4 | 4 | 4 |
| 1111 | 3 | 3 | 3 | 3 | 3 | 3 | 3 | 3 | 3 | 3 | 3 | 3 | 3 | 3 | 3 | 3 |
| 1110 | 4 | 4 | 4 | 4 | 4 | 4 | 4 | 4 | 4 | 4 | 4 | 4 | 4 | 4 | 4 | 4 |
| 1010 | 0 | 5 | 5 | 6 | 6 | 5 | 5 | 7 | 7 | 5 | 5 | 6 | 6 | 5 | 6 | 8 |
| 1011 | 4 | 4 | 4 | 4 | 4 | 4 | 4 | 4 | 4 | 4 | 4 | 4 | 4 | 4 | 4 | 4 |
| 1010 | 0 | 5 | 5 | 6 | 6 | 5 | 5 | 7 | 7 | 5 | 5 | 6 | 6 | 5 | 6 | 8 |
| 1001 | 0 | 5 | 5 | 6 | 6 | 5 | 5 | 7 | 7 | 5 | 5 | 6 | 6 | 5 | 6 | 8 |
| 1000 | 0 | 0 | 6 | 0 | 7 | 6 | 7 | 0 | 8 | 7 | 6 | 7 | 8 | 6 | 8 | 0 |

TABLE 4

Karnought Table for Output Qn Function - Nth bit set in the mask, assumption "a" position
is the lowest significant, "h" is the most significant, output equal to 0 means none bit detected as Nth.

| | hgfe | | | | | | | | | | | | | | | |
|---|---|---|---|---|---|---|---|---|---|---|---|---|---|---|---|---|
| dcba | 0000 | 0001 | 0011 | 0010 | 0110 | 0111 | 0101 | 0100 | 1100 | 1101 | 1111 | 1110 | 1010 | 1011 | 1010 | 1000 |
| 0000 | 0 | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 0 | 0 |
| 0010 | 0 | 0 | 0 | 0 | 0 | 0 | 0 | 0 | 0 | 0 | 0 | 0 | 0 | 0 | 0 | 0 |
| 0011 | 0 | 0 | 0 | 0 | 0 | 0 | 0 | 0 | 0 | 0 | 0 | 0 | 0 | 0 | 0 | 0 |
| 0010 | 0 | 0 | 0 | 0 | 0 | 0 | 0 | 0 | 0 | 0 | 0 | 0 | 0 | 0 | 0 | 0 |
| 0110 | 0 | 0 | 0 | 0 | 0 | 0 | 0 | 0 | 0 | 0 | 0 | 0 | 0 | 0 | 0 | 0 |
| 0111 | 0 | 0 | 0 | 0 | 0 | 0 | 0 | 0 | 0 | 0 | 0 | 0 | 0 | 0 | 0 | 0 |
| 0101 | 0 | 0 | 0 | 0 | 0 | 0 | 0 | 0 | 0 | 0 | 0 | 0 | 0 | 0 | 0 | 0 |
| 0100 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 0 | 0 | 0 | 0 |
| 1101 | 0 | 0 | 0 | 0 | 0 | 0 | 0 | 0 | 0 | 0 | 0 | 0 | 0 | 0 | 0 | 0 |
| 1111 | 0 | 0 | 0 | 0 | 0 | 0 | 0 | 0 | 0 | 0 | 8 | 0 | 0 | 0 | 0 | 0 |
| 1110 | 0 | 0 | 0 | 0 | 0 | 0 | 0 | 0 | 0 | 0 | 0 | 0 | 0 | 0 | 0 | 0 |
| 1010 | 0 | 0 | 0 | 0 | 0 | 0 | 0 | 0 | 0 | 0 | 0 | 0 | 0 | 0 | 0 | 0 |
| 1011 | 0 | 0 | 0 | 0 | 0 | 0 | 0 | 0 | 0 | 0 | 0 | 0 | 0 | 0 | 0 | 0 |
| 1010 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 0 | 0 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |

Note that there is only one nonzero combination.

Note that in some embodiments, there may be two decoders implemented for decoding the InputOutputRegisterMask into the InputOutputRenameTable, and a subset of the UnusedRegisterMask into the LocalRenameTable.

The BackRenameShifter is a hardware decoder used for back renaming Virtual Registers Numbers into a Real Registers mask value that can be used to program the InputOutputRegisterMask or UnusedRegisterMask. In one embodiment, this shifter may have N inputs, each of log N+1 bits, and one output having N bits, where N is the size of the register mask. In one embodiment, this hardware unit may include a block of shifters that shift left the value of 1 by the number of positions obtained from the corresponding input, and a block of OR gates, which logically sums the bit masks produced by the shifters.

Figure 4:
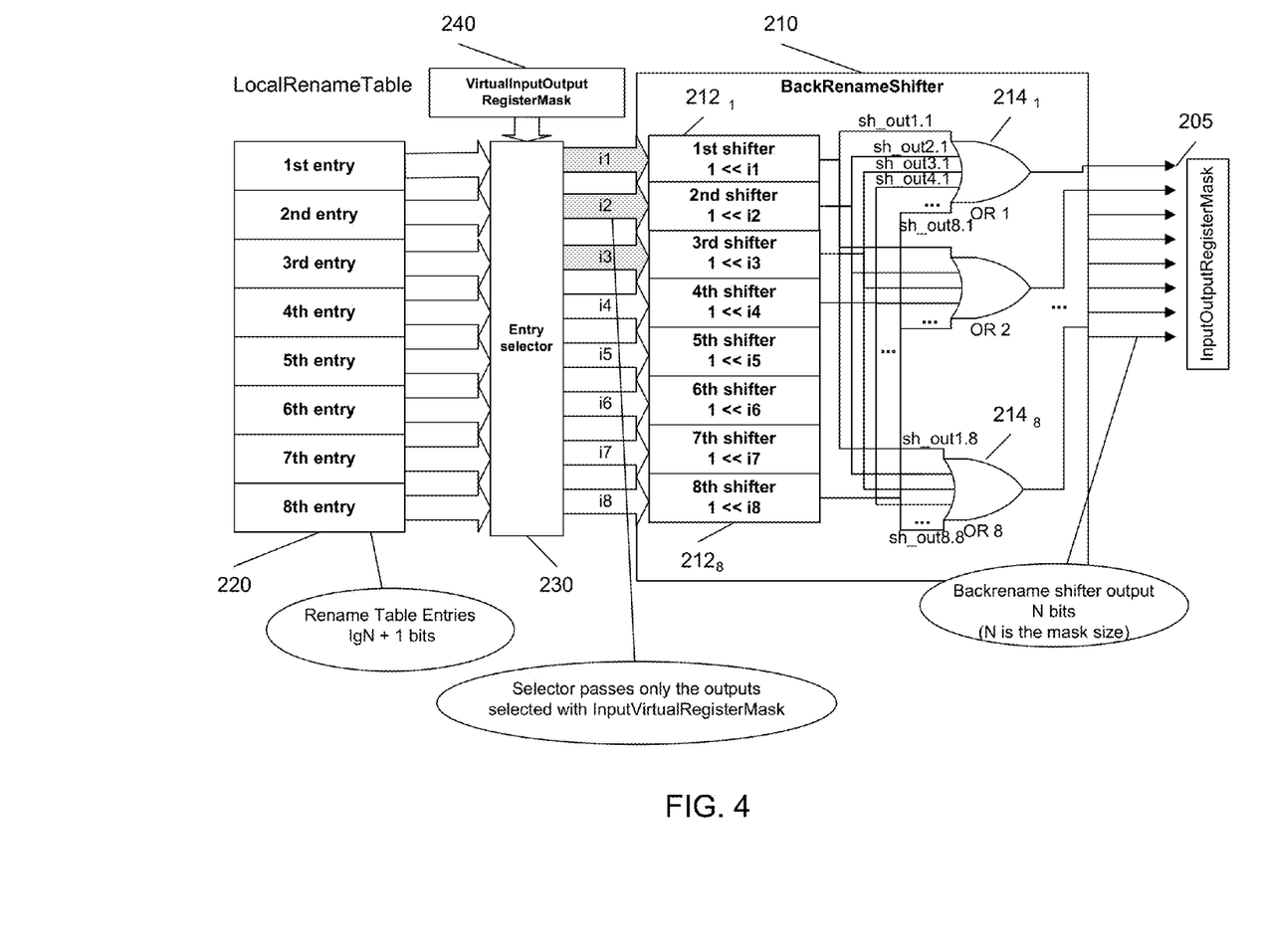
FIG. 4 is a block diagram illustrating use of a back rename shifter in accordance with an embodiment of the present invention.

Referring now to FIG. 4, shown is a block diagram of use of a back rename shifter in accordance with an embodiment of the present invention. As shown in FIG. 4, a back rename shifter 210 may be used to back rename VirtualInputOutputRegisterMask 240 to an InputOutputRegisterMask 205. More specifically, a local rename table 220 is coupled to an entry selector 230, which is controlled by the value of VirtualInputOutputRegisterMask 240 as the selection value, so that bits set in the mask select a subset of the LocalRenameTable entries to be passed as inputs to the BackRenameShifter unit 210. Because the entries of LocalRenameTable 220 contain the Real Register Numbers, those numbers are then shifted in a plurality of shifters $212_1$-$212_8$ to obtain bit masks with a bit set on the corresponding position. Then a plurality of OR gates $214_1$-$214_8$ sums all masks logically, and thus the value to be programmed into InputOutputRegisterMask 205 is calculated.

Other assumptions of the renaming method are as follows. Function local variables work always as Virtual Registers. They are mapped dynamically and automatically into Real Registers. This fact is expressed in instruction codes so that these local Virtual Registers are coded to be from a different register file than the general purpose register file, from the Local Virtual Register File, for example. Function inputs work also as special purpose Virtual Registers (that is to pass the function's parameters). Thus there is one additional virtual register file such as the Input Virtual Register File, to be used in instructions codes. Both virtual register files exist only in instruction encodings, as they map to the general purpose register file (with the register renaming). A different situation occurs with regard to function outputs, as a fixed subset of general purpose registers (Real Registers) can be used and thus such outputs do not need to be renamed. For example, a special register such as an accumulator can be used for returning values from functions. The scalar stack works identically as a conventional stack, however to maintain it in a small local memory of a simple SIMD RISC processor it passes only necessary information. For example, in one embodiment the processor can pass a function return pointer, the unused register mask, and the local spill fill mask. However, understand that additional or different information can be passed in other embodiments.

Merging the scalar stack with SIMD register renaming functionalities additionally allows resolving the problem of masking channels of some SIMD flows in instructions, as such a mask may be easily conveyed through the scalar stack.

In a scenario in which there are not enough set bits within the UnusedRegisterMask, the execution unit (EU) may perform automatically a register spill-fill to memory to free a block of registers for renaming. In this situation the UnusedRegisterMask is rebuilt to contain 1's on the positions corresponding to the registers spilled to memory. This operation may be done as a kind of trap subroutine or implemented fully in hardware. To protect some global registers from being used in the spill-fill process, a GlobalRegisterMask (set by the compiler) can be used in which each set bit denotes that the corresponding register cannot be used for spill-fills. However in some implementations global registers may not be supported to simplify hardware.

To remember the register being locally spilled to perform a back filling, software and/or hardware may calculate a value of the LocalSpillFillMask denoting Real Registers spilled to memory. The current value can be pushed to the stack once the spilling flushes SIMD registers to memory, and restored from the stack to restore (fill) SIMD registers from memory. After filling completion, the mask may be used to recombine the UnusedRegisterMask to obtain its original value before first local register allocation has been done in the function. In some embodiments, the UnusedRegisterMask can be also pushed to the stack during register spilling and popped on filling.

On each return from a function, a condition may be tested as to whether that function performed filling registers to memory. In one embodiment, the condition may be stored within a dedicated bit of the UnusedRegisterMask. If the condition is met, the back filling of the spilled registers can be done before the return from the function. Such action can be done as a trap subroutine or in hardware. In case of implementing explicit register renaming with a special instruction done on a function start, register spill-fills can also be implemented fully in software, since it is feasible to test the result of the explicit register renaming instruction and upon a fail perform a spill-fill code section.

Real Registers and other special register files can be globally used. That is, functions may use any kind of special register without mapping such as message registers/address registers, any in/out registers and so on, since the life range of that kind of special registers is typically local from the program perspective. Using Real Registers within functions can be realized as they hold values of program global variables.

Now described are processes for performing register renaming in accordance with an embodiment of the present invention. In following discussion, the following notation is used. SIMD registers belong to a dedicated register file noted with capital R(number), and scalar registers belong to a separate register file noted with small r(number), although embodiments are not so limited. Virtual local and input SIMD registers are noted with capital V and I, respectively. Note that Virtual local and input scalar registers are non-existent as a scalar stack is used instead of renaming.

Input register renaming in accordance with an embodiment of the present invention assumes that the SIMD registers used to pass parameters to functions (general purpose register for the first call level and local Virtual Registers for the second call level) maintain order in register numbering and that order is then reflected in the input register numbering. For example, if the compiler chooses R5, R7, R15 to pass parameters to a function that has 3 inputs such as I1, I2, I3, then the Input Register renaming process renames I1 to R5, I2 to R7 and I3 to R15. As mentioned previously, the renaming of input registers uses the InputOutputRegisterMask set by the compiler before the function call. For the mentioned example of renaming R5, R7 and R15 into inputs, the InputOutputRegisterMask will have 3 bits set (e.g., bits 5, 7, and 15), and thus the value of 0x80a0. In addition to the inputs, a return pointer is passed, and for that purpose the scalar stack is used.

In one embodiment, registers can be renamed according to the results of a sequence of operations each performing a get-first-bit-set-in-mask-and-clear-it operation. In the example, to rename Input Virtual Register I1 into a Real Register, the operation of get-first-bit-set-in-mask-and-clear-it may be performed on mask 0x80a0, which returns the result of 5. It also updates a copy of the InputOutputRegisterMask by clearing bit 5 so the value of it is updated to 0x8080. The next subsequent operation (e.g., a second get-first-bit-set-in-mask-and-clear-it) returns the result of 7 and clears bit 7, and the last such operation on that mask returns the result of 15 and clears the last set bit 15 so that the value of the used InputOutputRegisterMask is 0, which ends the process of input and output register renaming.

In various embodiments, hardware can accomplish the renaming much faster using the RegisterMaskDecoder, which can perform the above plurality of operations (e.g., multiple get-first-bit-set-in-mask-and-clear-it) in a single clock cycle. The result of such decoding is stored in the InputOutputRenameTable.

Figure 5:
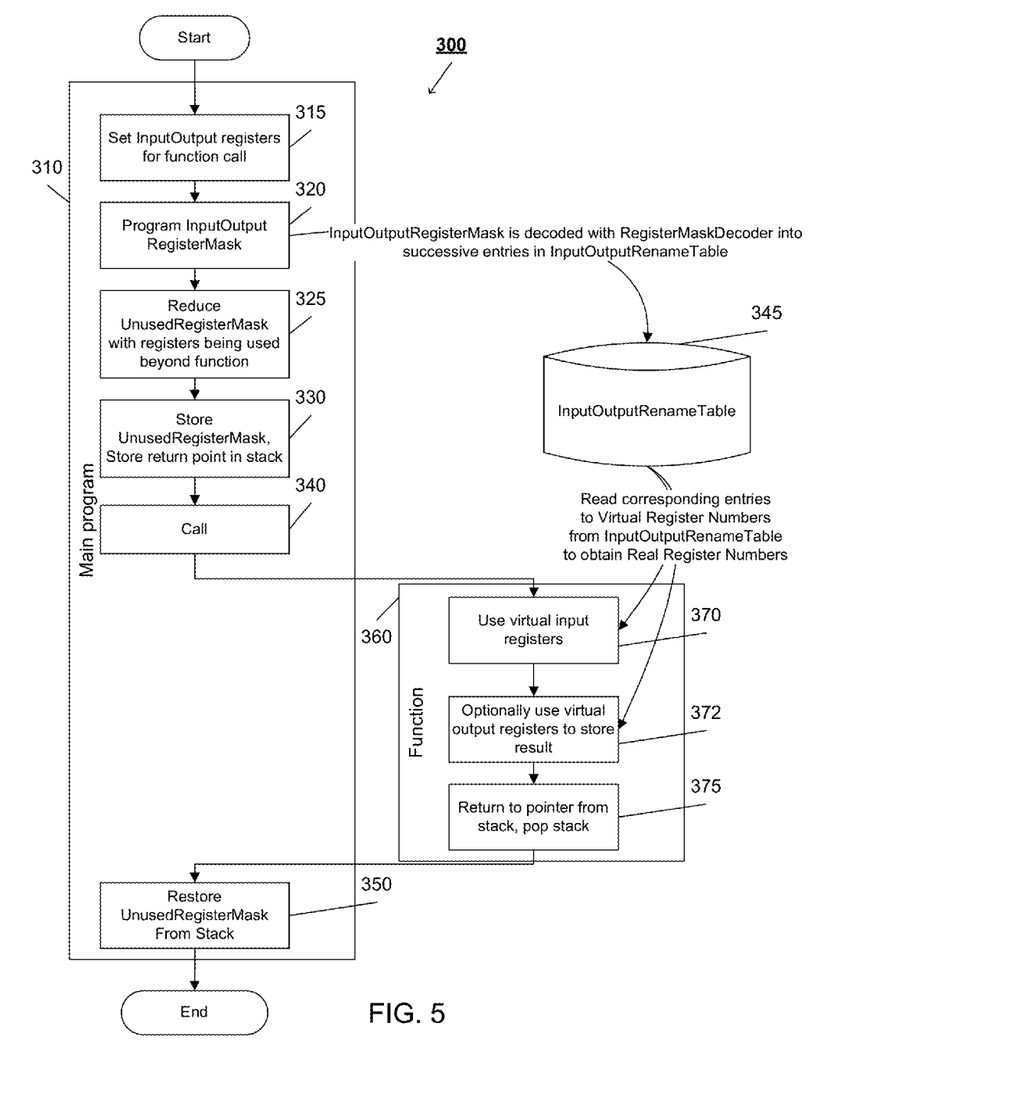
FIG. 5 is a flow diagram of a method for register renaming in accordance with an embodiment of the present invention.

Referring now to FIG. 5, shown is a flow diagram illustrating a register renaming process in accordance with an embodiment of the present invention. As shown in FIG. 5, method 300 may be performed during operation of a main program 310 that issues a function call 340 to a function 360. During execution of the function physical SIMD registers are renamed such that the need for passing parameters of a SIMD size to the function can be avoided.

As seen in FIG. 5, during program 310, input registers for a function call may be set (block 315). For example, assume that a function is to perform operations using 3 SIMD operands. Initial values for these 3 SIMD operands may thus be set, providing the desired initial values to these physical SIMD registers. Control then passes to block 320 where an input output register mask may be programmed. More specifically, a compiler may ensure that the input output register mask is programmed such that the set bits of the mask correspond to the input and output registers to be used for the function call, in the appropriate order. Control then passes to block 325 where the unused register mask may be reduced with registers that are being used beyond the function. More specifically, the compiler may set the unused register mask to a value where cleared bits are not available for further use, as such registers are being used beyond the function.

Still referring to FIG. 5, next control passes to block 330 where the unused register mask may be stored in a stack, along with a return pointer. In various embodiments, this register stack may be a scalar stack. Thus as seen there is no need to store any variables to the stack that are to be used in the function. In other words, there is no passing of parameters to the function. Instead, a renaming process can be performed automatically to thus obtain the desired initial values present in the SIMD physical registers. Accordingly, control passes to block 340 where the function may be called.

Control next passes to the function 360. During execution of various instructions in the function, the desired input registers may be used as indicated in the code of the function, as seen at block 370 and similarly desired output registers may be used to pass results from the function to the caller, as seen at block 372. However prior to their use, a renaming operation in accordance with an embodiment of the present invention is performed. Note that this renaming process may be automatically performed such that it is invisible both to the compiler and the program code (and thus also invisible to the programmer).

With regard to the renaming process note that the input output register mask that was programmed above may be decoded, e.g., using a register mask decoder in accordance with an embodiment of the present invention. As discussed above, this decoding operation may thus generate a plurality of entries within an input output rename table 345. In one embodiment, this decoding may thus generate a set of entries, where the first X entries correspond to the set values within the input output register mask. Accordingly, when a given input or output register is used within an instruction in function 360, the given entry within input output rename table 345 may be read to thus map from a virtual register number to a real register number, which can then be accessed as appropriate. For example, for a given mathematical operation, the register may be read to obtain a data value, and similarly a result of the operation may be stored to an appropriate register.

At the conclusion of function 360, control passes to block 375 where the pointer may be popped off the stack to thus return control back to the main program, and more specifically to block 350. At block 350 the unused register mask may be restored from the stack location. While shown with this particular illustration in the embodiment of FIG. 5, understand the scope of the present invention is not limited in this regard.

To further illustrate this renaming operation, reference can now be made to the pseudo code set forth in Table 5 below.

TABLE 5

```
// Program
main ( )
{
// declarations below are implicit in SIMD architectures
// added to better understand the example
.declare SIMD16_DWORD R5; //16 dwords large register
.declare SIMD16_DWORD R7; //16 dwords large register
.declare SIMD16_DWORD R15; //16 dwords large register
...
    simd(16) move R5, 7
    simd(16) move R7, 5
    simd(16) move R15, 2
    //prepare for calling
    simd(1) move InputOutputRegisterMask, 0x80a0
    simd(1) push UnusedRegisterMask
    simd(1) push return_point#
    simd(1) clear UnusedRegisterMask, 0x80a0
    call <MultiplyAndAdd>
return_point#:
    //restore UnusedRegisterMask
    simd(1) pop UnusedRegisterMask
    // use result, test if 0 on all subregisters for example ...
    simd(16) compare_if_equal ACC, 0 //acc - accumulator
...
}
// Function
SIMD16_DWORD /*return type */
MultiplyAndAdd( //return I1 * I2 + I3
    SIMD16_DWORD I1, /*input I1 */
    SIMD16_DWORD I2, /*input I2 */
    SIMD16_DWORD I3) /*input I3 */
{
    //use inputs, they are renamed automatically
    simd(16) multiply ACC, I1, I2 // ACC = R5 * R7
    simd(16) add ACC, ACC, I3 // ACC += R15
    return ACC//return SIMD accumulator and pop a return ptr
    from the stack
}
```

As seen in Table 5, operations are set forth in a main program to load initial values into SIMD physical registers, and then prepare for calling a function by pushing an unused register mask and a return pointer onto a stack. Then the function is called, which performs a desired operation, e.g., the multiply and add operations shown. At the conclusion of the function, the stack return pointer is popped and control then returns back to the main program where the unused register mask can be restored and further operations in the main program can be performed.

In the pseudo code example of Table 5 inside the MultiplyAndAdd function the InputOutputRenameTable for SIMD registers would have a set of entries including the values of 5, 7 and 15. Each setting of the InputOutputRegisterMask programs the InputOutputRenameTable (using the RegisterMaskDecoder) so that using a Virtual Register Number in any instruction in the added function of the program is realized by reading the corresponding position in the InputOutputRenameTable to translate it to a Real Register Number.

In the pseudo code example of Table 5, passing the output from the MultiplyAndAdd function is done with the special vector register of ACC (accumulator of the vector unit). This is acceptable practice very common in scalar functions implementations. However, for the same purpose, any virtual output register can be used. In Table 6 below a result from a LoadFromLinearMemory function can be passed within the virtual output register 14. That virtual register maps to R15 in the caller program in this example.

Input output register renaming for second level calls may be performed in a similar manner as discussed above for a first level function call using the InputOutputRegisterMask. However, the second level function is prepared in a different way. The difference lies in the indirect updating of the InputOutputRegisterMask by writing to the VirtualInputOutputRegisterMask, which is a mask value populated according to Virtual Register Numbers. During a write to the VirtualInputOutputRegisterMask, the Virtual Register Numbers are renamed back into Real Register Numbers and the result of such back renaming is written to the InputOutputRegisterMask (used then in the function for renaming). The back renaming process is discussed further below.

Local register renaming can be done in functions simply by modifying the value of the LocalRegisterMask. Each modification of the LocalRegisterMask causes reprogramming of the LocalRenameTable using information about available registers obtained from the UnusedRegisterMask, as shown above in FIG. 3. In other words, set bits in the LocalRegisterMask inform how many available registers can be obtained from the UnusedRegisterMask. The LocalRenameTable may be implemented in the same way as the InputOutputRenameTable so that successive entries contain positions of set bits in the mask.

A Local Virtual Register Number can be used in any instruction in the program simply by reading the corresponding entry in the LocalRenameTable to translate it to the Real Register Number. If a function calls another function (subroutine) and after returning from it there a need for using a local Virtual Register, then a compiler again reallocates that Virtual Register. In other words the LocalRegisterMask lifetime always finishes when calling another function. Before the reallocating, the value of the UnusedRegisterMask can be obtained from the scalar stack. The reallocation is done in the same way as allocation, namely by modifying the LocalRegisterMask that programs the LocalRenameTable using the UnusedRegisterMask, as shown in FIG. 3.

To implicitly rename back the VirtualInputOutputRegisterMask and VirtualUnusedRegisterMask into Real Registers numbers, hardware can access the correct positions (positions of set bits in the masks) from the LocalRenameTable and use the positions to create the value to be set in the InputOutputRegisterMask or the UnusedRegisterMask, respectively. In one embodiment, hardware can implement the BackRenamingShifter unit as depicted in FIG. 4 to do such back renaming within a single clock cycle.

Figure 6A:
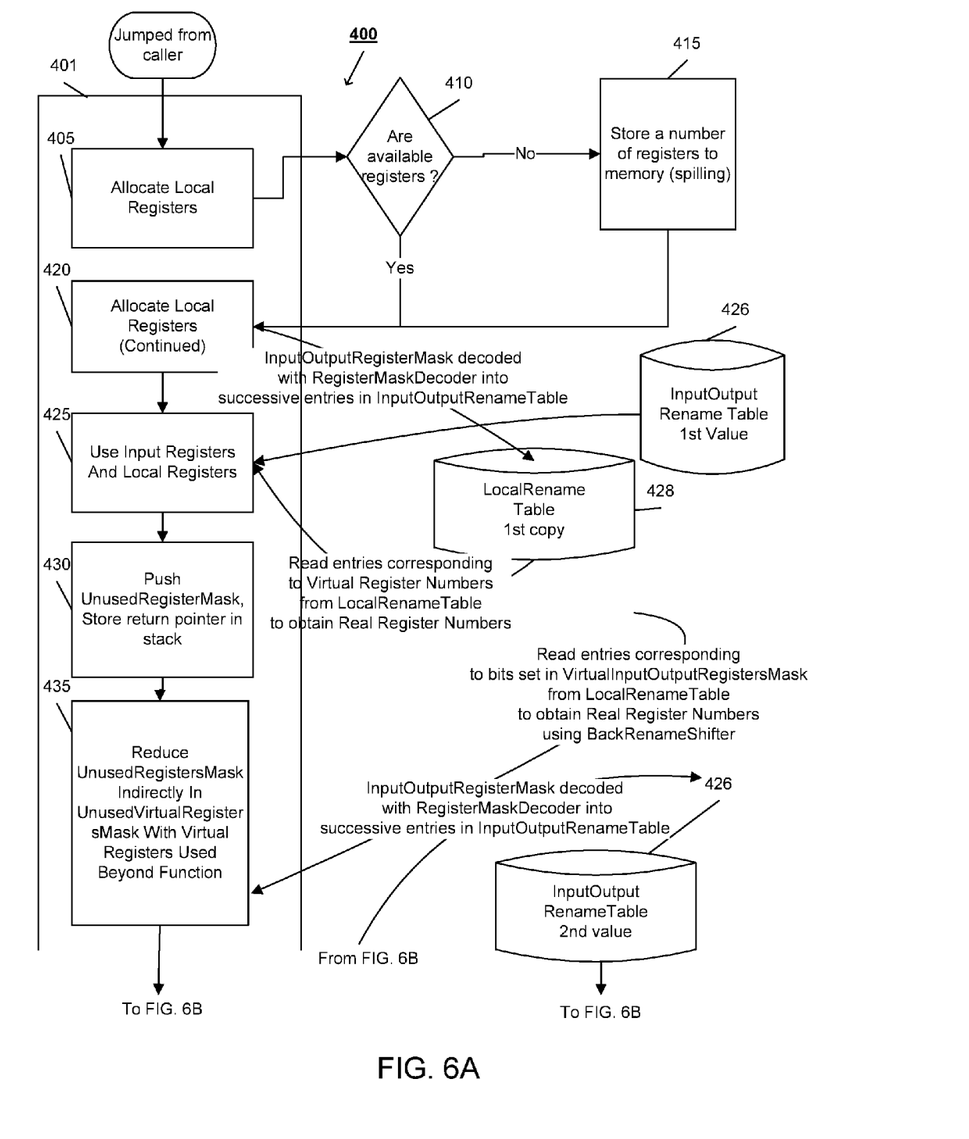
FIGS. 6A and 6B are flow diagram of a method for renaming registers within a function that includes a call to a next level function in accordance with an embodiment of the present invention.
Figure 6B:
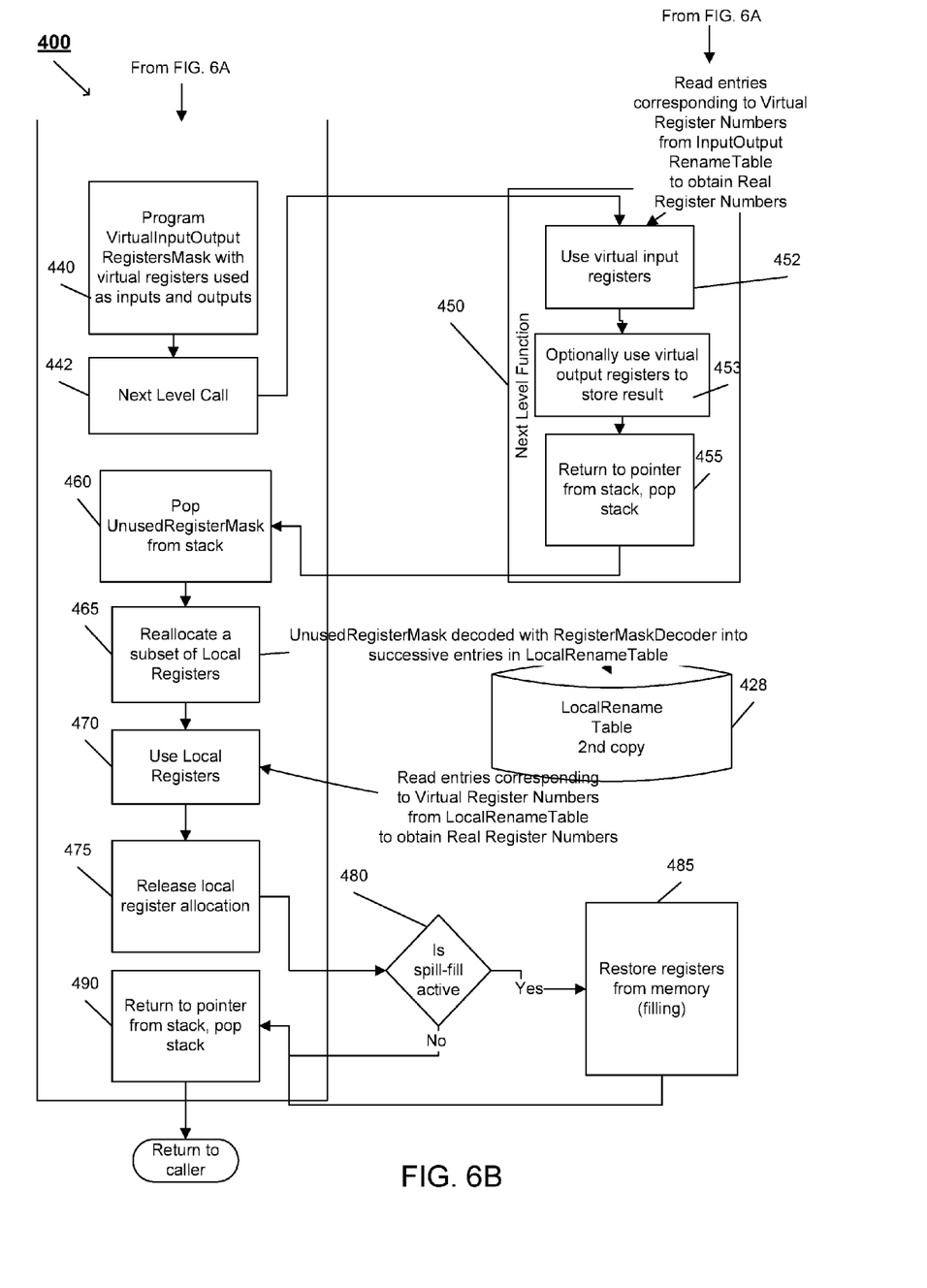

Referring now to FIGS. 6A and 6B, shown are flow diagrams of a method for renaming registers within a function that includes a call to a next level function in accordance with an embodiment of the present invention. As shown in FIGS. 6A and 6B, method 400 may begin by receiving control in a first function 401, namely a first level function, from a caller program. In function 401, the first operation may be to allocate local registers at block 405. As part of the allocation, it may be determined whether there are available registers (diamond 410). If not, a spill operation may be performed to store a number of registers to memory (block 415). In either event, control passes back to first function 401 for continuing allocating any local registers. Note that the local registers may be allocated simply by modifying entries in a local register, which causes the programming of a local rename table 428.

After the local registers are allocated, control passes to block 425 where various operations within the function may be performed using both input registers and local registers. The entries from both input output rename table 426 and local rename table 428 may be read to obtain real register numbers for accessing the physical registers in a SIMD register file.

Still referring to FIGS. 6A and 6B, the following operations may be used to prepare for a call to a second level function 450. More specifically, an unused register mask may be pushed onto the stack along with a return pointer (block 430). Control then passes to block 435, where the unused register mask may be reduced indirectly by clearing bits in this mask with virtual registers that are being used beyond the called function. To realize this, in one embodiment entries corresponding to bits that are set in an VirtualInputOutputRegisterMask may be read from the local rename table 428 to obtain real register numbers using, in one embodiment, a back rename shifter. As further preparation for a next level function call, control passes to block 440 where a virtual InputOutputRegisterMask may be programmed with virtual registers as inputs. Accordingly, input output rename table 426 may now be written with second values to thus provide mapping between virtual register numbers used in the next level function and real register numbers.

Accordingly, control passes in the function 401 to a next level function call 442, which causes control to pass to the next level function 450. Within this next level function, the input registers may be used (block 452) as well as output registers (block 453). Such use of input and output registers may be by performing the mapping discussed above with regard to the input output rename table. Similarly as with the operations described with regard to FIG. 5, after the operations of the function are completed, a pointer may be returned from the stack (block 455) and control thus passes back to the first level function 401.

More specifically, control passes to block 460 where the unused register mask may be popped from the stack. At block 465 a subset of local registers may be reallocated. In one embodiment, the unused register mask may be decoded using the register mask decoder to generate a updated version of a local rename table 428. Using the information in this local rename table, local registers may be used during function operations (block 470). As discussed above, entries within the local rename table may thus be read to map from virtual register numbers to real register numbers. At the conclusion of the use of such local registers, control passes to block 475 where all local register allocations may be released. Furthermore, control may pass to diamond 480 where it may be determined whether a spill fill was performed above. If so, control passes back to block 485 where the registers that were spilled to memory may be restored. In either event, control passes finally to block 490 where control may return back to the main caller by popping return pointer from the stack. While shown with this particular implementation in the embodiment of FIGS. 6A and 6B, understand the scope of the present invention is not limited in this regard.

To further illustrate this second level renaming operation, reference can now be made to the pseudo code set forth in Table 6 below, which generally tracks the operations described above with regard to FIGS. 6A and 6B. As seen in the example of Table 6, inside the LoadFromLinearMemory function the LocalRenameTable would have subsequent values of 16, 17 and 18 for SIMD registers after modifying the LocalRegisterMask with 7, with the assumption that the UnusedRegisterMask had SIMD registers set from 16 to 31 available.

TABLE 6

Local and Input Register Renaming with second level function
```
// Program
main ( )
{
// declarations below are implicit in SIMD architectures
// added to better understand the example
.declare SIMD16_DWORD R5; //16 dwords large register
.declare SIMD16_DWORD R7; //16 dwords large register
.declare SIMD16_DWORD R15; //16 dwords large register
//assumption is that UnusedRegisterMask allows R16 to R31 to be
renamed initially
...
    simd(16) move R5, 7
    simd(16) move R7, 5
    simd(16) move R11, 2
    //prepare for calling with R15 as the result
    simd(1) push UnusedRegisterMask
    simd(1) push return_point#
    simd(1) move InputSIMDRegisterMask, 0x88a0
    simd(1) clear UnusedRegisterMask, 0x88a0
    call <LoadFromLinearMemory>
return_point#:
    //restore UnusedRegisterMask
    simd(1) pop UnusedRegisterMask
    // use result, test if 0 on all subregisters for example ...
    simd(16) compare_if_equal ACC, 0 //acc - accumulator
...
}
// Function level 1
SIMD16_DWORD /*return type */
LoadFromLinearMemory(
    SIMD16_DWORD I1, /*input I1 */
    SIMD16_DWORD I2, /*input I2 */
    SIMD16_DWORD I3, /*input I3 */
    SIMD16_DWORD I4) /*output I4 */
{
    // explicit operation of renaming local virtual regs
    // writes a subset of UnusedRegisterMask to LocalRegisterMask
    // it may do registers spilling to memory
    simd(1) move LocalRegisterMask, 7 // V0 V1 V2
    //use inputs
    simd(16) multiply V0, I1, 3 // R16(V0) = R5(I0) * 3
    //copy inputs for the next level call
    simd(16) move V1, I2
    simd(16) move V2, I3
    //prepare inputs for calling of second level function
    simd(1) push UnusedRegisterMask
    simd(1) push return_point#
    simd(1) move VirtualInputOutputRegisterMask , 7 //V0 V1 V2
    //reduce UnusedRegisterMask by V0 V1 V2 indirectly
    simd(1) clear VirtualUnusedRegisterMask, 0x7
    call <MultiplyAndAdd>
return_point#:
    //restore UnusedRegisterMask indirectly
    simd(1) pop VirtualUnusedRegisterMask
    simd(16) load I4, [ACC] // load from linear address being in acc
    simd(16) add I4, I4, V0 // add V0 (just to show V0 liferange)
    // Release local allocations
    // it may do registers refilling from memory
    simd(1) move r0, -1 // DWORD register r0 used to pass -1 to clear
    simd(1) clear LocalRegisterMask, r0
    return I4
}
// Function level 2 of MultiplyAndAdd is identical to MultiplyAndAdd
from the pseudo code of Table 5
```

Figure 7:
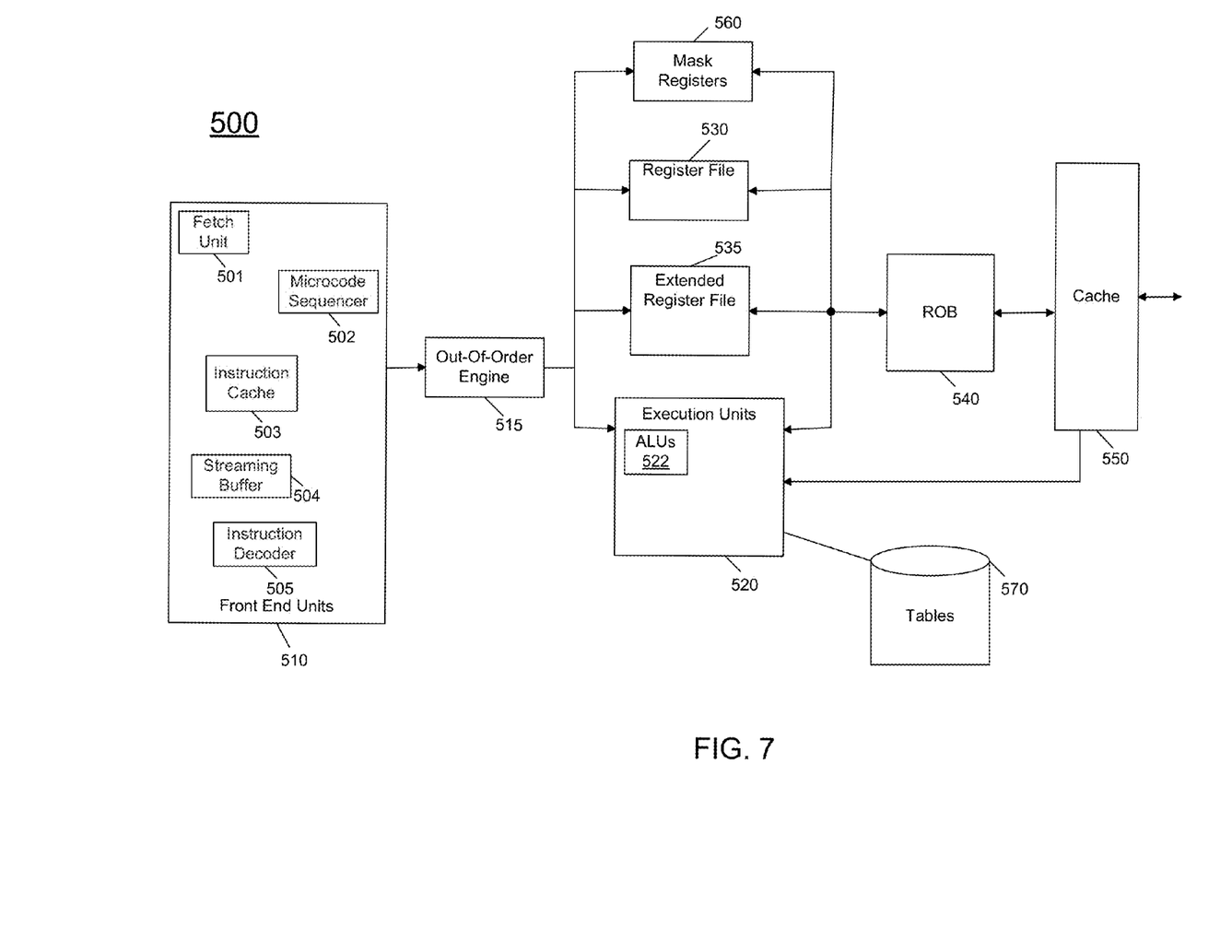
FIG. 7 is a block diagram of a portion of a processor in accordance with one embodiment of the present invention.

Embodiments can be implemented in many different systems. For example, embodiments can be realized in many different processor types such as graphics processors, general purpose processors such as a multicore processor, or so forth. Referring now to FIG. 7, shown is a block diagram of a portion of a processor in accordance with one embodiment of the present invention. As shown in FIG. 7, processor 500 may be a multi-stage pipelined out-of-order processor. Processor 500 is shown with a relatively simplified view in FIG. 7 to illustrate interaction between various register files and mask registers in accordance with an embodiment of the present invention.

As shown in FIG. 7, processor 500 includes front end units 510, which may be used to perform instruction fetch and to prepare them for use later in the processor. For example, front end units 510 may include a fetch unit 501, a microcode sequencer 502, an instruction cache 503 that can store both macro-instructions and uops, a streaming buffer 504, and an instruction decoder 505. Fetch unit 501 may fetch macro-instructions, e.g., from memory or instruction cache 503, and feed them to instruction decoder 505 to decode them into primitives, i.e., micro-operations for execution by the processor. In turn, microcode sequencer 502 may interface with the various front end structures to initiate and handle microcode fetches from wherever in a system microcode is stored when the instruction decoder does not decode a given instruction. Streaming buffer 504 may be used to interface with a memory hierarchy to enable the fetch of instructions (including microcode flows) that miss in instruction cache 503. Understand that FIG. 7 is shown at a relatively high level to describe the interaction between components used in performing microcode fetch.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

In addition, a set of mask registers 560 may be provided to enable storage of various masks used in embodiments of the present invention. These registers 560 may provide for storage of the different register masks to be used in renaming operations for vector registers in extended register file 535 during function calls. In addition to these various storages, processor 500 may further include table storages 570 for use in connection with renaming tables in accordance with an embodiment of the present invention. These tables may be implemented via static random access memory (SRAM) in one embodiment. While the scope of the present invention is not limited in this regard, the tables may be of relatively limited amounts of entries and may include rename tables including input and local rename tables. These tables, like the mask registers, can be implemented as unitary or separate structures, in different embodiments.

Various resources may be present in execution units 520, including, for example, various integer, floating point, and single instruction multiple data (SIMD) logic units, among other specialized hardware. For example, such execution units may include one or more arithmetic logic units (ALUs) 522. Results may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 7, ROB 540 is coupled to a cache 550 which, in one embodiment may be a low level cache (e.g., an L1 cache). Also, execution units 520 can be directly coupled to cache 550. From cache 550, data communication may occur with higher level caches, system memory and so forth. While shown with this high level in the embodiment of FIG. 7, understand the scope of the present invention is not limited in this regard. For example, in other embodiments a processor may be a simple RISC design implemented as a graphics processor.

Figure 8:
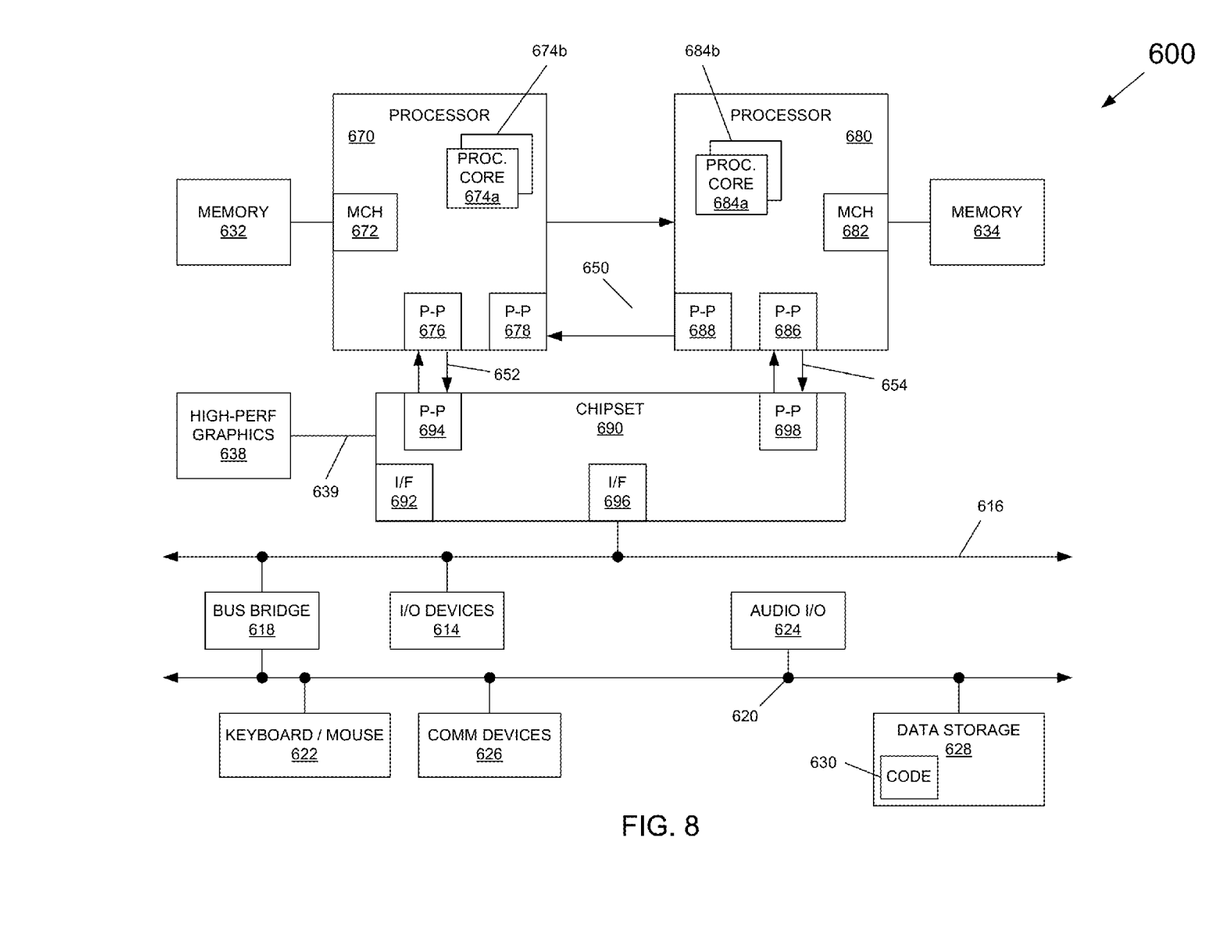
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674*a* and 674*b* and processor cores 684*a* and 684*b*), although potentially many more cores may be present in the processors. These cores may, in some embodiments, include mask registers and tables to enable the processor to perform renaming of registers present in code of a function to physical registers of a SIMD register file, without the need for passing SIMD operands to the function.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of main memory (e.g., a dynamic random access memory (DRAM)) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Embodiments may thus provide for SIMD function calling using renamed virtual registers for passing arguments for the function and local variables used therein. Furthermore, embodiments may track automatically the availability of the registers, so that a block spill-filling to memory operation can be performed to free/restore a block of registers if needed. Embodiments thus provide a classical stack (with pushes and pops) and the performance of the register stacks.

Thus rather than conventional function calling which requires pushing and then popping input variables and parameters from the register stack, embodiments may use register renaming. In other words, many fewer move instructions can be used to do a function call. In this way, performance of a SIMD architecture that has very large registers (e.g., 256, 512 bits or more) can be improved. Embodiments also allow mixing the two techniques of using local function variables present in local registers together with global parameters present in global registers, as SIMD architectures may benefit from the very large register set. Also, in various embodiments a scalar stack can be used only to pass a minimal portion of the information and thus it can be maintained in a small portion of a local memory. In parallel SIMD architectures with hardware multithreading the number of parallel hardware threads that may implement their own stacks can be in the range from 100 to 1000.

Thus function calling for SIMD architectures can be performed optimally, taking into account the fact very large SIMD registers are not easy to push and pop to any kind of stack. For example a SIMD32 register having 512 bits needs 8 cycles to do a move on some SIMD architectures. By renaming such registers so that the moves are reduced to minimum and passing only "renaming" information through the call stack, embodiments may efficiently perform function calling.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a scalar register file;
    a single instruction multiple data (SIMD) register file;
    an execution unit to perform a function call from a main program to a function that is to operate on at least one SIMD operand, wherein the execution unit is to pass only scalar values to the function, and input values to the function including the at least one SIMD operand are to be renamed from input registers expressed in code of the function to registers of the SIMD register file;
    an input output register mask to be programmed by the main program and to store a value corresponding to an identity of registers of the SIMD register file to be used in the function;
    an input output rename table to store a plurality of entries, wherein the plurality of entries are to be generated responsive to the value of the input output register mask, the input output rename table to be indexed by the input or output registers and each indexed entry is to identify a corresponding register of the SIMD register file to be used in the function; and a virtual input output register mask to be programmed by the function and to store a value corresponding to an identity of virtual registers of the SIMD register file to be used by a second function called by the function, wherein the input output rename table is to provide a mapping between virtual register numbers used by the second function to register numbers of the SIMD register file.

2. The processor of claim 1, wherein a compiler is to set the value of the input output register mask in order of use of the input registers or output registers in the code.

3. The processor of claim 1, further comprising a register mask decoder coupled to receive the input output register mask and to populate the entries of the input output rename table based on the input output register mask value.

4. The processor of claim 3, further comprising an unused register mask to store a value corresponding to an identity of registers of the SIMD register file that can be used as local registers in the code of the function.

5. The processor of claim 4, further comprising an entry selector coupled to an output of the register mask decoder to select a portion of entries output by the register mask decoder responsive to input of the unused register mask based on a local register mask to generate entries of a local rename table, the entries of the local rename table each to identify registers of the SIMD register file to be used as the local registers.

6. The processor of claim 3, further comprising a back rename shifter to receive outputs of a local rename table as selected by a value of the virtual input output register mask and to generate an updated value of the input output register mask to be used by the second function called by the function.

7. The processor of claim 6, wherein the back rename shifter includes:
a first set of shifters each to receive and shift an entry from the local rename table; and
a plurality of logic gates coupled to the first set of shifters each to output a corresponding bit of the updated value of the input output register mask.

8. A method comprising:
programming, by a main program, an input output register mask stored in a first mask register of a processor with a value corresponding to an identity of registers of a vector register file to be used in a function called by the main program, without passing values of the registers of the vector register file to the function, and without passing after execution of the function result values of registers of the vector register file from the function;
programming a unused register mask stored in a second mask register of the processor with a value corresponding to an identity of registers of the vector register file that can be used as local registers in the function;
storing the unused register mask and a return pointer in a scalar stack, and thereafter calling the function;
accessing the input output register mask from the first mask register and decoding the input output register mask to generate an input output rename table including a plurality of entries each to identify a corresponding register of the vector register file to be used in the function;
programming, by the function, a virtual input output register mask stored in the first mask register of the processor with a value corresponding to an identity of registers of the vector register file to be used in a second function called by the function;
calling the second function from the function; and
accessing the virtual input output register mask from the first mask register and decoding the virtual input output register mask to update the input output rename table with entries corresponding to input or output registers to be used in the second function.

9. The method of claim 8, wherein the input output register mask is accessed invisibly to a compiler and code of the function.

10. The method of claim 9, further comprising executing an operation of the function encoded with an input or output register by indexing, using the input or output register, into an entry of the input output rename table including an identification of a register of the vector register file to be used in the function.

11. The method of claim 8, further comprising, in the function, spilling a plurality of the registers of the vector register file to a memory, and identifying the spilled registers via a spill mask stored in a fourth mask register of the processor, including setting a spill indicator of the spill mask to indicate the spilling.

12. The method of claim 11, further comprising after returning to the function from a call to a second function, accessing the spill mask and restoring the spilled registers from the memory to the registers of the vector register file responsive to the set spill indicator.

13. A system comprising:
a processor including a first register file to store scalar operands, a second register file to store vector operands, a mask storage to store a first value corresponding to an identity of registers of the second register file to be used as input registers and output registers in a function, and a table storage to store a first plurality of entries generated responsive to the first value each to identify a corresponding register of the second register file to be used as one of the input registers or the output registers in the function, wherein the mask storage is to further store a second value corresponding to an identity of registers of the second register file that can be used as local registers in the function, and the table storage is to store a second plurality of entries to identify a corresponding register of the second register file to be used as one of the local registers; and
a dynamic random access memory (DRAM) coupled to the processor.

14. The system of claim 13, wherein the processor is to perform a function call from a main program to the function that is to operate on at least one vector operand stored in a register of the second register file without use of a stack for the at least one vector operand, and to use a stack for scalar values, wherein the processor is to store at least one value from the mask storage to the stack, the at least one value corresponding to an identity of registers of the second register file that can be used as local registers in the function.

15. The system of claim 14, wherein prior to the function call, the first value is set to a value corresponding to an in order use of the input and output registers in the function.

16. The system of claim 15, wherein the processor further comprises a mask decoder coupled to receive the first value and to populate the first plurality of entries of the table based on the first value.

* * * * *